US009672969B2

(12) United States Patent
Eriksson et al.

(10) Patent No.: US 9,672,969 B2
(45) Date of Patent: Jun. 6, 2017

(54) HIGH VOLTAGE ELECTROMAGNETIC INDUCTION DEVICE

(71) Applicant: ABB Schweiz AG, Baden (CH)

(72) Inventors: Anders Eriksson, Vasteras (SE); Erik Wedin, Ludvika (SE); Jan Lindgren, Grängesberg (SE); Mats Berglund, Ludvika (SE); Mats Ramkvist, Ludvika (SE); Stina Bertilsson, Smedjebacken (SE); Tina Brunström, Ludvika (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/705,537

(22) Filed: May 6, 2015

(65) Prior Publication Data

US 2015/0325356 A1 Nov. 12, 2015

(30) Foreign Application Priority Data

May 7, 2014 (EP) .................................... 14167346

(51) Int. Cl.
*H02G 3/18* (2006.01)
*H01B 17/26* (2006.01)
*H01B 17/28* (2006.01)
*H01F 27/04* (2006.01)
*H01F 27/02* (2006.01)

(52) U.S. Cl.
CPC ........... *H01F 27/04* (2013.01); *H01F 27/022* (2013.01)

(58) Field of Classification Search
CPC ...... H01F 27/04; H01F 27/022; H01F 27/362; H01F 27/29; H01F 27/322; H01F 27/12; H01B 17/26
USPC ....... 336/90, 192, 94; 174/142, 143, 30, 650
See application file for complete search history.

(56) References Cited

U.S. PATENT DOCUMENTS 2,531,638 A * 11/1950 Miller ..................... H01T 13/05 174/152 S

FOREIGN PATENT DOCUMENTS

EP 0285895 A1 10/1988
EP 2528071 A1 11/2012
(Continued)

OTHER PUBLICATIONS

European Search Report Application No. EP 14 16 7346 Issued: Sep. 17, 2014 4 pages.

*Primary Examiner* — Mangtin Lian
(74) *Attorney, Agent, or Firm* — Whitmyer IP Group LLC

(57) ABSTRACT

A high voltage electromagnetic induction device including: a lead-through device-receiving structure having an opening for receiving a lead-through device, a lead-through device extending through the opening, wherein an internal portion is tapering in a direction along the central axis of the lead-through device away from the opening, and an electrical insulation barrier which is arranged in the lead-through device-receiving structure, arranged around and distanced from the internal portion, and which electrical insulation barrier is tapering in the direction, whereby a duct is formed between the internal surface of the electrical insulation barrier and the external surface of the internal portion of the lead-through device, wherein the electrical insulation barrier is tapering relative to the lead-through device such that the distance between the internal surface of the electrical insulation barrier and the external surface of the lead-through device increases in the direction.

14 Claims, 2 Drawing Sheets

(56) References Cited

FOREIGN PATENT DOCUMENTS

| | | | | |
|---|---|---|---|---|
| WO | 2010060450 | A1 | | 6/2010 |
| WO | WO 2010/060450 | A1 | * | 6/2010 |

* cited by examiner

HIGH VOLTAGE ELECTROMAGNETIC INDUCTION DEVICE

FIELD OF THE INVENTION

The present disclosure generally relates to high voltage electromagnetic induction devices. In particular it relates to a high voltage electromagnetic induction device which comprises a lead-through device and an electrical insulation barrier arranged to insulate the lead-through device within the high voltage electromagnetic induction device.

BACKGROUND OF THE INVENTION

A high voltage electromagnetic induction device, such as a power transformer or a reactor, typically comprises a lead-through device which is an electrically insulated elongated device having a conductor arranged along its central axis.

The lead-through device extends into the high voltage electromagnetic induction device through a wall of the high voltage electromagnetic induction device and connects with the internal electric components. The lead-through device thus provides electrical insulation between the conductor and the wall, which typically has a significantly different electric potential than the conductor of the lead-through device and the internal electrical components during operation. The lead-through device thus defines an interface between the internal electric components of the high voltage electromagnetic induction device and external electric components located outside the high voltage electromagnetic induction device, for example valves of a valve hall.

The conductor of the lead-through device is connected to the internal electric components inside the high voltage electromagnetic induction device, for example inside the turret. The turret is a structure mounted to or integrated with the tank of the high voltage electromagnetic induction device, and adapted to receive a lead-through device. An electrical insulation system is arranged to electrically insulate leading parts from the wall and other structures, including the connection between the conductor and internal electric components, e.g. windings. In order to increase the electric withstand strength of the electrical insulation system it is possible to utilize pressboard barriers which are shaped according to the profile of the lead-through device. The electrical withstand strength is increased because the oil duct outside the lead-through device is reduced in size.

WO2010060450 A1 discloses an example of such an insulation system. In particular, WO2010060450 A1 discloses a barrier arrangement for a cable having barriers arranged next to each other and disposed at prescribed distances from each other. By introducing an additional barrier element between the cable duct and the barrier arrangement, an additional radial oil segment is created, so that the permissible field strengths within the oil can be increased.

SUMMARY OF THE INVENTION

The inventors of the present disclosure have realised that the lead-through device surface has a drawback in that the electric resistance in the longitudinal direction along the duct increases closer to the lead-through device end. The reason for that is that the cross-sectional area between the barrier and the lead-through device is smaller compared to solutions which have a number of cylindrical barriers arranged around the lead-through device end portion, due to the reduced diameter provided by the barrier. An uneven resistance distribution results in uneven stress and creep stress distribution which naturally results in increased maximum stresses and therefore reduced electric withstand strength.

In view of the above, an object of the present disclosure is to provide a high voltage electromagnetic induction device which may solve or mitigate the problems of the prior art.

There is hence provided a high voltage electromagnetic induction device comprising: a lead-through device-receiving structure having an opening for receiving a lead-through device, a lead-through device extending through the opening, the lead-through device thereby having an external portion extending outside the lead-through device-receiving structure, and an internal portion extending within the lead-through device-receiving structure, wherein the internal portion is tapering in a direction along the central axis of the lead-through device away from the opening, and an electrical insulation barrier which is arranged in the lead-through device-receiving structure, which electrical insulation barrier is arranged around and distanced from the internal portion, and which electrical insulation barrier is tapering in said direction, whereby a duct is formed between the internal surface of the electrical insulation barrier and the external surface of the internal portion of the lead-through device, wherein the electrical insulation barrier is tapering relative to the lead-through device such that the distance between the internal surface of the electrical insulation barrier and the external surface of the lead-through device increases in said direction.

An effect which may be obtainable by means of the different angles of the tapering internal portion of the bushing and the electrical insulation barrier, in particular by means of an increasing distance between the bushing and the electrical insulation barrier the further away from the opening, is that the electrical field may be controlled in a more beneficial manner. In particular, a more even voltage drop, stress and creep stress may be obtained.

According to one embodiment the electrical insulation barrier extends along the majority of the internal portion of the lead-through device.

According to one embodiment the electrical insulation barrier is an innermost barrier relative to the lead-through device.

According to one embodiment the electrical insulation barrier has a smaller tapering angle than the lead-through device.

According to one embodiment the electrical insulation barrier tapers continually in said direction.

According to one embodiment the electrical insulation barrier has a tapering angle which is essentially constant along a majority of the internal portion in said direction.

According to one embodiment the distance between the external surface of the internal portion of the lead-through device and the internal surface of the electrical insulation barrier increases as the electrical insulation barrier and the internal portion taper.

One embodiment comprises a dielectric liquid, wherein the dielectric liquid is arranged in the duct.

According to one embodiment the lead-through device-receiving structure is a turret.

According to one embodiment the lead-through device is a bushing.

According to one embodiment the internal surface of any cross-section of the electrical insulation barrier is essentially circular.

According to one embodiment the high voltage electromagnetic induction device is a high voltage DC electromagnetic induction device.

According to one embodiment the high voltage electromagnetic induction device is a power transformer.

According to one embodiment the high voltage electromagnetic induction device is a reactor.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION OF THE INVENTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
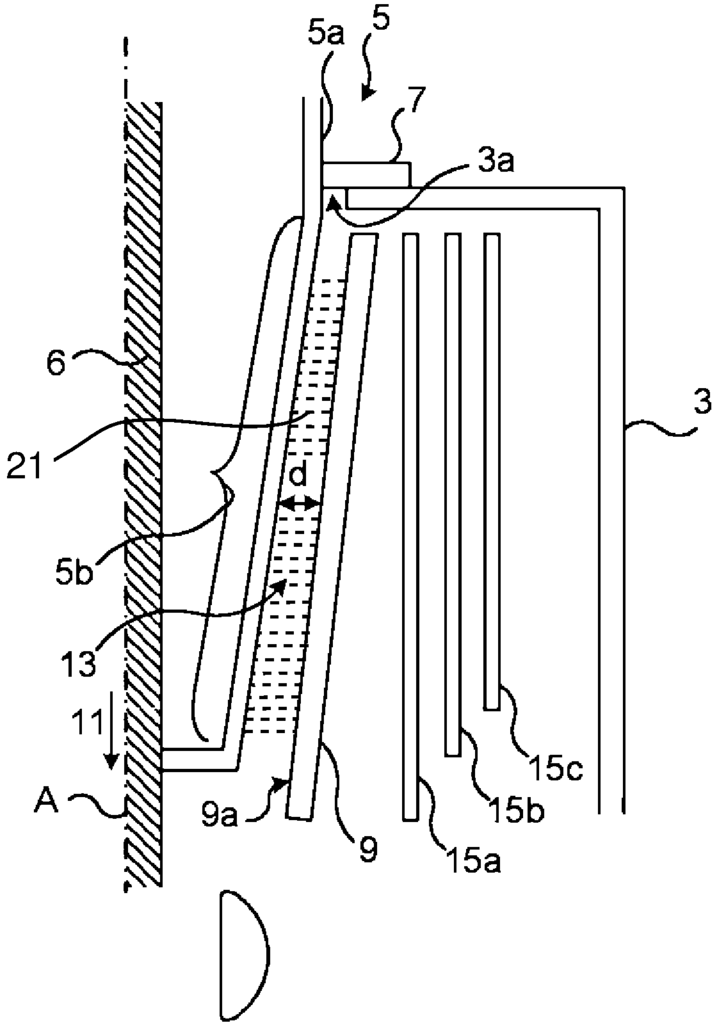
FIG. 1 schematically depicts a sectional view of a lead-through device and an electrical insulation barrier arranged in a high voltage electromagnetic induction device, with only one side shown along a symmetry axis.
Figure 2:
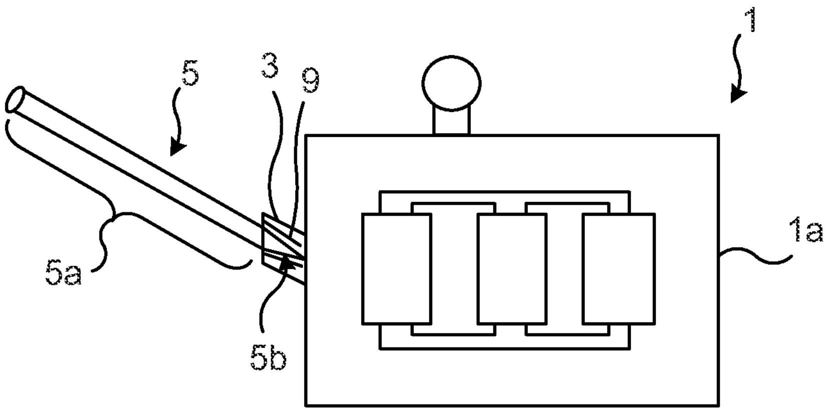
FIG. 2 depicts a schematic sectional view of a high voltage electromagnetic induction device comprising the electrical insulation barrier and lead-through device in FIG. 1.

FIG. 1 shows a portion of a high voltage electromagnetic induction device 1 depicted in FIG. 2. The high voltage electromagnetic induction device 1 comprises a lead-through device-receiving structure 3 which has an opening 3*a* arranged to receive a lead-through device. The lead-through device-receiving structure 3 thus defines a means through which a lead-through device can be lead into the high voltage electromagnetic induction device 1. The lead-through device-receiving structure 3 is according to the present example a turret, but could in general be any structure through which a lead-through device is lead from an external environment to the interior of a high voltage electromagnetic induction device.

The high voltage electromagnetic induction device 1 further comprises a lead-through device 5 arranged in the opening 3*a* of the lead-through device-receiving structure 3. The lead-through device 5 may for example be a bushing, in particular a high voltage bushing, for example a high voltage DC bushing. The lead-through-device 5 may for example be mounted to the lead-through device-receiving structure 3 by means of a flange 7.

The lead-through device 5 comprises an electrical conductor 6 extending through the centre of the lead-through device 5, along a central axis A. The electrical conductor 6 is arranged to be connected to windings arranged inside the high voltage electromagnetic induction device 1.

The lead-through device 5 has an external portion 5*a* which extends outside the lead-through device-receiving structure 3 and thus outside the high voltage electromagnetic induction device 1, and an internal portion which extends in the lead-through device-receiving structure 3 and thus inside the high voltage electromagnetic induction device 1. The external portion 5*a* may typically extend in air while the internal 5*b* may typically extend in a dielectric fluid.

The internal portion 5*b* is defined as the entire portion of the lead-through device 5 which is arranged inside the lead-through device-receiving structure 3. The internal portion 5*b* of the lead-through device 5 is tapering in a direction 11 away from the opening 3*a*, more specifically in a direction along a central axis A of the lead-through device 5, away from the opening 3*a*. The diameter of the internal portion 5*b* of the lead-through device 5 hence becomes narrower as the distance increases from the opening 3*a*.

The high voltage electromagnetic induction device 1 further comprises an electrical insulation barrier 9 which tapers in the direction 11 and extends around the external surface 5*c* of the lead-through device 5. The internal surface 9*a* of the electrical insulation barrier 9 is arranged at a distance d from the external surface 5*c* of the lead-through device 5. A duct 13 which is annular is hence formed between the internal surface 9*a* of the electrical insulation barrier 9 and the external surface 5*c* of the lead-through device 5. The distance d between the internal surface 9*a* of the electrical insulation barrier 9 and the external surface 5*c* of the lead-through device 5 increases in the direction 11 as a function of the distance from the opening 3*a*. Since the electrical insulation barrier 9 is tapering, the internal surface 9*a* on any two facing sides of the symmetry axis are non-parallel and there is thus an angle therebetween which defines the rate at which two facing sides of the internal surface 9*a* approach each other in the direction 11. This angle and the corresponding angle for the lead-through device 5 are herein termed a tapering angle. The tapering angle of the electrical insulation barrier 9 is smaller than the tapering angle of the internal portion 5*b* of the lead-through device 5. The electrical insulation barrier 9 and the lead-through device 5 thus become more and more distanced from each other in the direction 11.

Figure 1A:
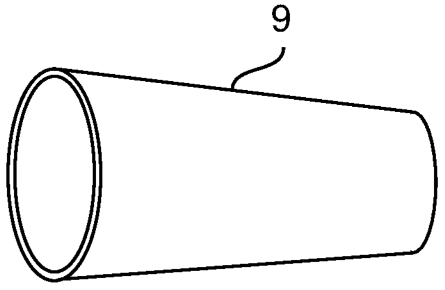
FIG. 1A depicts an isometric view of the electrical insulation barrier of the high voltage electromagnetic induction device of FIG. 1.

According to one embodiment the electrical insulation barrier 9 has a tapering angle which is constant along a majority of the electrical insulation barrier 9 in the direction 11. According to one variation the electrical insulation barrier 9 tapers continually in the direction 11. Furthermore, according to one variation the electrical insulation barrier 9 has a constant or essentially constant tapering angle, i.e. the electrical insulation barrier 9 is conical or essentially conical but with the sharp top cut off. The internal surface 9*a* of the electrical insulation barrier 9 is in any cross-section circular or essentially circular, as shown in FIG. 1A.

The electrical insulation barrier 9 extends along the majority of the internal portion of the lead-through device 5. More specifically, the electrical insulation barrier 9 extends along a majority of the length of the internal portion of the lead-through device 5 in the direction 11.

The electrical insulation barrier 9 may for example be made of a cellulose-based material such as an electrical insulation paper, for example pressboard.

The high voltage electromagnetic induction device 1 may further comprise a dielectric fluid 21, preferably a dielectric liquid 21 arranged in the duct 13. The dielectric liquid may for example be transformer oil.

The high voltage electromagnetic induction device 1 may according to one variation comprise additional electrical insulation. The additional electrical insulation may for example comprise a plurality of concentrically arranged barriers 15*a*-15*c* arranged around the internal portion 5*b* of the lead-through device 5. According to one variation, the electrical insulation barrier 9 is the innermost barrier relative to the lead-through device 5 and barriers 15*a*-15*c*. The barriers 15*a*-15*c* are hence arranged around the electrical insulation barrier 9. The electrical insulation barrier 9 is hence the first barrier encountered when following a line in the radial direction from the external surface 5*c* of the lead-through device 5.

FIG. 2 depicts a schematic sectional view of an example of a high voltage electromagnetic induction device 1, for the purpose of facilitating the understanding of where the electrical insulation barrier 9 may be located in a high voltage electromagnetic induction device 1.

The high voltage electromagnetic induction device 1 comprises a tank 1*a* which encloses an electromagnetic core and windings wound around the electromagnetic core. The high voltage electromagnetic induction device 1 further comprises lead-through device-receiving structure 3, lead-through device 5 arranged in the lead-through device-receiving structure 3, and the electrical insulation barrier 9 arranged around the internal portion 5*b* of the lead-through device 5.

The electromagnetic induction device 1 may be a high voltage direct current (HVDC) electromagnetic induction device or a high voltage alternating current (HVAC) electromagnetic induction device. The high voltage electromagnetic induction device 1 may for example be a high voltage power transformer or a reactor.

The inventive concept has mainly been described above with reference to a few examples. However, as is readily appreciated by a person skilled in the art, other embodiments than the ones disclosed above are equally possible within the scope of the inventive concept, as defined by the appended claims.

What is claimed is:

1. A high voltage electromagnetic induction device comprising:

a lead-through device-receiving structure having an opening for receiving a lead-through device, the lead-through device extending through the opening, the lead-through device thereby having an external portion extending outside the lead-through device-receiving structure, and an internal portion extending within the lead-through device-receiving structure, wherein the internal portion is tapering in a direction along the central axis of the lead-through device away from the opening, and an electrical insulation barrier which is arranged in the lead-through device-receiving structure, wherein the electrical insulation barrier is arranged around and distanced from the internal portion, and wherein the electrical insulation barrier is tapering in said direction, whereby a duct is formed between an internal surface of the electrical insulation barrier and an external surface of the internal portion of the lead-through device, wherein the electrical insulation barrier is tapering relative to the lead-through device such that the distance between the internal surface of the electrical insulation barrier and the external surface of the lead-through device increases in said direction.

2. The high voltage electromagnetic induction device as claimed in claim 1, wherein the electrical insulation barrier extends along the majority of the internal portion of the lead-through device.

3. The high voltage electromagnetic induction device as claimed in claim 1, wherein the electrical insulation barrier is an innermost barrier relative to the lead-through device.

4. The high voltage electromagnetic induction device as claimed in claim 1, wherein the electrical insulation barrier has a smaller tapering angle than the lead-through device.

5. The high voltage electromagnetic induction device as claimed in claim 1, wherein the electrical insulation barrier tapers continually in said direction.

6. The high voltage electromagnetic induction device as claimed in claim 1, wherein the electrical insulation barrier has a tapering angle which is essentially constant along a majority of the internal portion in said direction.

7. The high voltage electromagnetic induction device as claimed in claim 1, wherein the distance between the external surface of the internal portion of the lead-through device and the internal surface of the electrical insulation barrier increases as the electrical insulation barrier and the internal portion taper.

8. The high voltage electromagnetic induction device as claimed in claim 1, comprising a dielectric liquid, wherein the dielectric liquid is arranged in the duct.

9. The high voltage electromagnetic induction device as claimed in claim 1, wherein the lead-through device-receiving structure is a turret.

10. The high voltage electromagnetic induction device as claimed in claim 1, wherein the lead-through device is a bushing.

11. The high voltage electromagnetic induction device as claimed in claim 1, wherein the internal surface of any cross-section of the electrical insulation barrier is essentially circular.

12. The high voltage electromagnetic induction device as claimed in claim 1, wherein the high voltage electromagnetic induction device is a high voltage DC electromagnetic induction device.

13. The high voltage electromagnetic induction device as claimed in claim 1, wherein the high voltage electromagnetic induction device is a power transformer.

14. The high voltage electromagnetic induction device as claimed in claim 1, wherein the high voltage electromagnetic induction device is a reactor.

* * * * *